United States Patent [19]

Kolycheck

[11] 4,408,020
[45] Oct. 4, 1983

[54] CURABLE POLYURETHANES

[75] Inventor: Edmond G. Kolycheck, Lorain, Ohio

[73] Assignee: The B. F. Goodrich Company, Akron, Ohio

[21] Appl. No.: 392,851

[22] Filed: Jun. 28, 1982

[51] Int. Cl.$^3$ .............................................. C08G 18/30
[52] U.S. Cl. ................................... 525/415; 525/438; 525/440; 525/454; 528/75
[58] Field of Search ............... 525/415, 438, 440, 454; 528/49, 75

[56] References Cited

U.S. PATENT DOCUMENTS

| | | | |
|---|---|---|---|
| 4,254,230 | 3/1981 | Howard | 525/28 |
| 4,255,243 | 3/1981 | Coqueugniot et al. | 204/159.15 |
| 4,260,703 | 4/1981 | Hodakowski et al. | 525/455 |
| 4,264,752 | 4/1981 | Watson | 525/467 |

*Primary Examiner*—Maurice J. Welsh
*Attorney, Agent, or Firm*—J. Hughes Powell, Jr.

[57] ABSTRACT

Polyurethanes prepared from hydroxyl terminated polymers, organic diisocyanates and polyethers having terminal hydroxyl and unsaturated groups or terminal hydroxyl and pendant unsaturated groups, are soluble in solvents for deposition on a carrier that after removal of the solvent can be wound and processed as by calendaring and slitting immediately after removal from a solvent drying oven without layer to layer adhesion or other disruption of the coating. After such processing, the binder compositions containing the polyurethane may be crosslinked or cured in a few seconds by electron beam radiation to provide an improved stable coating. These polyurethanes combined with phenoxy resins form particularly useful binder systems for magnetic tape.

14 Claims, No Drawings

CURABLE POLYURETHANES

BACKGROUND OF THE INVENTION

Magnetic recording media normally consist of a base film or support and a magnetic coating. The most widely used support in magnetic tape is poly-(ethylene terephthalate). The magnetic coatings normally contain, by volume, 40 to 55% magnetic material, usually a ferrimagnetic material, embedded in a binder matrix of about 30 to 35% of a polymeric material and small amounts of other additives such as lubricants, dispersants, conductive agents and the like. Of particular utility as organic polymer binders are the polyurethanes. In most present processes for manufacturing magnetic recording media, the polyurethane polymeric binder system is usually crosslinked chemically to improve stability and resistance to heat, decrease blocking and to provide enhanced life. In the case of polyurethane binders, this is usually accomplished by adding a polyfunctional isocyanate cross linker to the magnetic coating mix before deposition on the carrier. After deposition and drying to remove the solvent, the tape is wound or processed and the curing or crosslinking is usually accomplished by aging the rolls for 24 to 48 hours. A polyurethane binder that did not have to be cured or crosslinked by a polyisocyanate would be a great advantage. The variable isocyanate cure obtained because of the effect of even small amounts of moisture could be eliminated, and a faster curing system would provide for increased production rates. Thus, a polyurethane that can be quickly cured without the use of a polyisocyanate is desired.

Polymers not requiring a polyisocyanate cure are described, for example, in U.S. Pat. No. 4,255,243 disclosing photo-crosslinkable unsaturated poly-(carbonate-urethanes) obtained by condensing a diisocyanate with a polycarbonate-diol and a lower hydroxyalkyl acrylate. U.S. Pat. No. 4,260,703 discloses radiation curable urethane-acrylates prepared by reacting an alkoxylate of an ester diol such as 2,2-dimethyl-3-hydroxypropyl-2,2-dimethyl-3-hydroxypropionate with a diisocyanate, capped with a hydroxyalkyl acrylate such as hydroxyethyl acrylate. U.S. Pat. No. 4,264,752 discloses compositions formed by the reaction of a polycarbonate polyol, a polyisocyanate and a hydroxy acrylate monomer as hydroxyethyl acrylate that can be used as a component of radiation curable coatings. Also U.S. Pat. No. 4,254,230 discloses actinic radiation-curable unsaturated polyetherester urethanes in the presence of air. These are complex polymers containing at least one unsaturated urethane oligomer, said oligomer comprising the reaction product of at least one unsaturated active hydrogen-containing compound, at least one polyisocyanate; and at least one polyetherester. The amount of said unsaturated compound being present in amount molar equivalent to the isocyanate compound. None of these compounds are completely satisfactory as polyurethanes for electron beam curing for magnetic tape applications.

SUMMARY OF THE INVENTION

Polyurethanes prepared from hydroxyl terminated polymers, organic diisocyanates and polyethers having terminal hydroxyl and unsaturated groups or terminal hydroxyl and pendant unsaturated groups, are soluble in solvents for deposition on a carrier that after removal of the solvent can be wound and processed as by calendaring and slitting immediately after removal from a solvent drying oven without layer to layer adhesion or other disruption of the coating. After such processing, the binder compositions containing the polyurethane may be crosslinked or cured in a few seconds by electron beam radiation to provide an improved stable coating. These polyurethanes combined with phenoxy resins form particularly useful binder systems for magnetic tape.

DETAILED DESCRIPTION

In accordance with this invention the electron beam curable polyurethanes include polyurethanes of hydroxyl terminated polyesters, polylactones, polyethers, polycarbonates, polyhydrocarbons and the like. The polyurethanes are readily prepared from a variety of compounds having terminal functional groups reactive with organic isocyanates. Normally used are hydroxyl-terminated compounds having molecular weights greater than about 300 to 400 to 10,000. The most commonly used compounds or macropolyols are hydroxyl-terminated polyesters, polyethers, polyacetals, polycarbonates, polybutadienes and polyacrylates, alone or in a mixture, having molecular weights greater than about 400, optionally with polyfunctional chain extenders such as diols. Useful materials are obtained from mixtures of a macroglycol and a small polyfunctional polyol chain extender such as an alkylene glycol or ether glycol, a cycloaliphatic glycol, or an aromaticaliphatic glycol, and the like. In the so-called prepolymer technique an excess of organic diisocyanate is first reacted with the macroglycol and unsaturated polyester or polyether and then the small difunctional chain extender added, normally in amounts equivalent to react with substantially all of the free isocyanate groups.

The hydroxyl (polylkylene oxide), or polyether macroglycols, preferably are essentially linear hydroxyl-terminated compounds having ether linkages as the major linkage joining carbon atoms. The molecular weights may vary between about 400 and 10,000, usually to about 2,000. The hydroxyl (polyalkylene oxide)s as hydroxyl poly (tetramethylene oxide), hydroxyl poly (trimethylene oxide), hydroxyl poly (hexamethylene oxide), hydroxyl poly (ethylene oxide) and the like of the formula $HO[(CH_2)_nO]_xH$ wherein n is a number from 2 to 6 and x is an integer, and alkyl substituted types such as hydroxyl poly (1,2-propylene oxide); tetrahydrofuran and ethylene oxide copolyethers; and the like.

The polyester glycols include linear hydroxyl-terminated polyesters having molecular weights between about 400 and 10,000, usually about 2,000. The polyesters utilized include those prepared by the polyesterification of aliphatic dicarboxylic acids including, for example, malonic, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 1 to 10 carbon atoms, preferably 4 to 6 carbon atoms. The phthalic acids are also useful. The glycols used in the preparation of the polyesters by reaction with the dicarboxylic acids are normally aliphatic polyols containing between 2 and 10 carbon atoms, usually 2–6, such as ethylene glycol, propanediol, butanediol, hexamethylene glycol, decamethylene glycol, 2-ethylhexanediol-1,6, neopentyl glycol and the like; 1,4 cyclohexanedimethanol; and aromatic polyols or bis-1,4(-hydroxyethoxy) benzene. Poly-esteramides also are contemplated, usually by substitution of a diamine or amino alcohol for at least part of the glycol.

Poly(epsilon-caprolactone)diols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX-R-XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4, hexamethylene glycol and the like. Ethylene glycol provides excellent polyesters.

The lactones preferred for preparing the polyesters are epsilon-caprolactones having the general formula

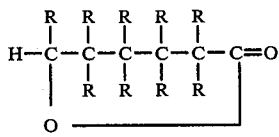

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, α-methylepsilon-caprolactone, β-methyl-epsiloncaprolactone, dimethyl-epsilon-caprolactone and the like. The lactones are polymerized readily by heating with the bifunctional reactant to a temperature of about 100 to about 200° C. Catalysts may be employed if desired. Particularly preferred are poly(epsilon-caprolactone)diols having molecular weights in the range of about 400 to about 10,000, normally to about 2,000.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and like reacted with glycols; for example, ethylene glycol, hexanediol, diethylene glycol and the like which are well known to those skilled in the art. Generally, the polyacetals may be considered to be reaction products of aldehydes and glycols. The molecular weights of the polyacetal will be varied from about 400 to 10,000, normally about 2,000.

Typical polyhydrocarbonurethanes useful in the practice of the invention will include hydroxyl terminated liquid polymers having an aliphatic polymeric backbone prepared by polymerizing at least one vinylidene monomer having at least one terminal $CH_2{<}$- group per monomer molecule together with at least one hydroxyl containing disulfide as is described in U.S. Pat. No. 4,120,766. Such liquid polymers may have a backbone derived from, for example, ethylene, isobutylene, butadiene, acrylate and methacrylate esters alone or with other vinylidene monomers such as styrene or acrylonitrile as is described in the aforementioned patents. Other methods for making hydroxyl containing liquid polymers are well known such as reacting an aminoalcohol with a liquid carboxyl terminated polymer having backbones of the type disclosed above. The molecular weight of these materials will range from about 400 to 5,000.

The polycarbonate glycols include reaction products of polyols and phosgene or organic carbonate compounds. Of the polyols, poly(oxyalkylene glycol)s may have the general formula $HO(R'O)_xH$ wherein R is an alkylene radical containing 2 to 10 carbon atoms and x is an integer, integer, typically from 1 to 5. The alkylene glycols normally contain 2 to 10 carbon atoms. Typical materials include, for example, ethylene glycol, 1,4-butanediol, 1,6-hexanediol, diethylene glycol, 1,2-propylene glycol, dipropylene glycol, 2-ethyl-1,6-hexanediol, 1,5-pentanediol, 1,4-cyclohexanediol, 1,2,6-hexanetriol, polyoxyethylene glycols and triols, polyoxypropylene glycols and the like. The organic carbonates may have the formula

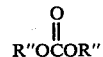

wherein the R's are alkyl radical containing 1 to 8 carbon atoms, and cyclic radicals containing 6 to 10 carbons in the ring. Typical compounds include dimethyl carbonate, diethyl carbonate, dipropyl carbonate, diphenyl carbonate, dicyclohexyl carbonate, and the like. Polyurethanes of this invention made with poly(hexamethylene carbonate) glycol are readily cured and have good properties.

One essential component of the electron beam curable polyurethanes is a copolyether selected from the group consisting of polyethers having a single terminal double bond or vinyl group and a terminal hydroxyl group; and polyether glycols with with pendant double bonds or vinyl groups, there being an average of from about ½ to about 18 such double bonds per molecule. About 1 to 3 double bonds represents a typical range. The copolyethers are prepared from tetrahydrofuran, alkylene oxide and hydroxyalkyl esters of acrylic or methacrylic acid. These materials may be represented by the formula

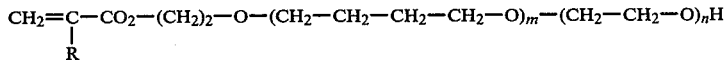

wherein R is H or methylene, m is a number from 4 to 20, and n is a number from 3 to 13. Normally these copolyether acrylates and methacrylates have a molecular weight range from about 400 to 2,000. The alkylene oxides may contain 2 to 4 carbon atoms and ethylene oxide is typical. A preferred group of materials have molecular weights from 400 to above 2,000.

Typical polyetherglycols containing pendant groups containing double bonds include tetrahydrofuran based ether glycols. For example, copolyethers of tetrahydrofuran and allyl glycidyl ether, and copolyethers of tetrahydrofuran, alkylene oxides containing 2 to 3 carbon atoms, i.e. ethylene oxide, and allyl glycidyl ether. A typical polyetherglycol with pendant groups can have the structural formula

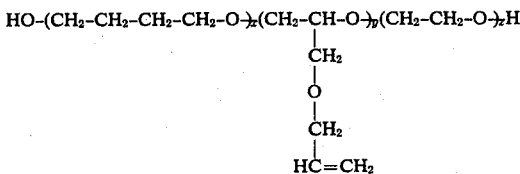

wherein x is 4 to 20, y is 1 to 18 and z is 0 to 13. Typical molecular weight are Mn(OH) about 500 to 1,400 and the polymers contain about 50 to 60 mole percent tetrahydrofuran, about 50 to 60 mole percent ethylene oxide and about 5 to 50 mole percent allyl glycidyl ether. The amount of terahydrofuran in the polymers may be varied from about 5 to 95 mole percent, more normally from about 40 to 60 mole percent; with from about 100 to about 5 weight percent allyl glycidyl ether or methallyl glycidyl ether, with the remainder an alkylene oxide such as ethylene oxide or other oxides containing from 2 to 3 carbon atoms. There may also be pendant acrylate or methacrylate groups. A preferred group of materials have molecular weight from 400 to 2,000.

As to the amounts of the these unsaturated polyethers used, there is normally used up to about 20 weight percent of the copolyethers containing one terminal hydroxyl and one terminal acrylate or methacrylate group, usually about 3 to 12 weight percent of the total of copolyether and polyol used, i.e. from about 0.04 to 0.23 mols per mol of the other polyols. The polyether glycols containing pendant unsauration may be used in amounts from about 5 to 100 weight percent of the total polyols used, usually about 25 to 75 weight percent. Mixtures of these two types of unsaturated polyethers may be used.

The molecular weight range of these unsaturated polyethers is from about 300 to 2,000, normally about 400 to 1,400.

If small glycols are used as chain extenders with the macropolyols and the organic diisocyanate, these normally are aliphatic glycols or ether glycols containing 2 to 10 carbon atoms. Typical glycols which have been employed include ethylene glycol, propylene glycol, butanediol-1,4, hexanediol, 2-ethylhexanediol-1,6, neopentyl glycol, 1,4-butenediol, 2-butene-1,4-diol, and the like. Cycloaliphatic glycols such as cyclohexanedimethanol, and aromatic-aliphatic glycols such as bis-1,4-(hydroxyethoxy)benzene, may also be employed.

The amount of glycol chain extender used with the macropolyol and the diisocyanate may vary from about 0.1 to 10 mols per mol of macroglycol. Excellent polyurethanes are obtained with a molar ratio of one mole of macropolyol and 1 to 5 mols of the small chain extender glycol. Substituted glycols also may be used.

The organic polyisocyanates which are reacted with the macropolyols, unsaturated polyethers and optional polyol will include, for example, alicyclic, aliphatic and aromatic diisocyanates. Such aliphatic diisocyanates include for example, hexamethylene diisocyanate, methylenebis (4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, diphenyl methane diisocyanate, dibenzyl diisocyanate, diphenyl ether diisocyanates, bitolylene diisocyanates, m-and p-tetramethylxylene diisocyanate, and the like, for example diisocyanates of the formula OCN-Ar-X-Ar-NCO wherein Ar is cyclic, i.e. an arylene or alicyclic radical, and X may be a valence bond, an alkylene radical containing 1 to 5 carbon atoms, or NR where R is an alkyl radical, oxygen, sulfur, sulfoxide, sulfone and the like.

About equimolar ratios of diisocyanate and total polyols i.e. —OH to NCO groups, may be used. When a small polyol chain extender is also used, the ratio of reactants employed may be varied from about 1.5 to 13 mols of organic diisocyanate per mol total of macropolyol and unsaturated hydroxyl polyether with 0.5 to 12 mols of the polyol. The amount of organic diisocyanate used is dependent on the total amount of chain extender, unsaturated polyether and macropolyol, and normally is a molar amount essentially equivalent to the total of these latter reactants so that there are essentially no free unreacted isocyanate groups remaining in the polymer. Excellent polyurethanes have been obtained when a molar ratio of one mol total of macropolyol and unsaturated hydroxyl polyether of molecular weight about 800 to 4,000, 0.1 to 3 mols of diol chain extender and 1.1 to 4 mols of the diisocyanate are caused to react. While essentially equimolar amounts of isocyanate and active hydrogen groups are often preferred, it will be understood that small excesses of a reactant or excess organic diisocyanate can be used in forming prepolymers. Normally, there should be less than 0.005 percent by weight of unreacted isocyanate groups, preferably essentially no residual isocyanate groups, in the electron beam curable polyurethanes.

Catalysts may be used to speed up the polyurethane formulation and any of those catalysts normally used by those skilled in the art may be employed. Typical catalysts include dibutyltin dilaurate, stannous octoate, tertiary amines such as triethylamine and the like may be used, normally in amounts from about greater than 0.01 up to 10 phr or polyurethane, and more normally greater than about 0.025 up to 5 phr.

Particularly useful in magnetic tape applications is a binder combination of the novel polyurethanes of this invention combined with a phenoxy resin. The phenoxy resin, used in amounts of about 2 to about 100 parts by weight per 100 weight parts of polyurethane, is a thermoplastic, linear, high molecular weight copolymer of bisphenol A and epichlorohydrin, said copolymer having the molecular structure

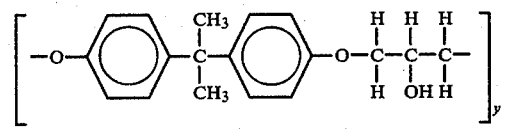

where y is a number of such magnitude that the molecular weight of said copolymer is within the range of about 20,000 to about 40,000, and preferably about 30,000.

These copolymers of epichlorohydrin/bisphenol A are well known materials commonly referred to as phenoxy resins. The plastics are commercially available under the trademark "Bakelite" phenoxy resins. One method for their preparation is described in U.S. Pat. No. 2,602,075. The thermoplastic phenoxy resins have melt-flow temperatures within the range of about 125° C. to about 150° C.

The compositions are conveniently prepared by blending the polyurethane and the phenoxy resin as in solution. The two polymers are unexpectedly very compatible and form a remarkably homogeneous blend, this despite their widely differing chemical molecular structures. The improvement in processing characteristics of the blends compared to both the polyurethane and the phenoxy resin alone is apparent when the materials are milled and extruded. For instance, the tendency of the hot plastics to stick to the mill is reduced by the mixing thereof, and better surface appearance and higher extrusion rates are obtained. A further advantage of the use of the electron beam curable polyurethanes is to decrease or prevent any exudates from the phenoxy resin.

The compositions of this invention may also have incorporated therein small amounts, e.g., from about 0.1 to 20 parts per hundred parts by weight of the polyurethane, of well known elastomers modifiers to serve as mechanical processing aids, for example, inert fillers such as silica, and lubricants such as calcium stearate.

The compositions of this invention are soluble in various solvents such as dimethyl formamide, dioxane, cyclohexanone, tetrahydrofuran, and methyl ethyl ketone. The most useful solutions contain from about 10 to about 30 weight percent of the polymer mixture. More rapid solubilization of the compositions is obtained by moderate heating, i.e., to around 30° C. to 50° C. Coatings of the polymer blend may applied from the aforesaid solutions on the surfaces of metals and fabrics by the well known operations of spraying, dipping, knife or roller coating. Films are produced by the usual method of casting from solution and removing the solvents.

The films and coatings of the mixture of polymers have superior physical properties than previous unmodified polyurethane.

In the following examples, the polyurethanes were prepared by first melting the polyether or polyester glycol, adding the unsaturated hydroxy polyether, chain extender the organic diisocyanate and heating to complete the reaction to form the polyurethane. The temperature range employed is usually greater than 50° C. to about 250° C. The reaction is conducted in the substantial absence of moisture as under vacuum or dry nitrogen. In most of the examples there was included a stabilizer, Irganox 1010, tetrakis-[methylene 3-(3,5-di-t-butyl-4-hydroxyphenyl)-propionate]. The polyurethanes were dissolved in tetrahydrofuran (THF) to form about 25% (15–40%) solutions, cast on release paper, and dried at 110° C. The samples were then cured with electron beam radiation at 5 and 10 megarad dosages by exposing the films to a 5 milliamp, 185,000 volt beam at a rate of 22 feet per second linear speed of the film, and at 10 milliamps to provide a dosage of 10 megarads. Normally the range of exposure may be from about 0.5 to less than 15 megarads, the latter being such that if often adversely effects the physical properties of the polymers. A more useful range is about 1 to 12 megarads.

Cure is evidenced by decrease in elongation and increased modulus of the polyurethanes, as well as insolubility and a low swell in tetrahydrofuran. Samples that have not crosslinked or cured will dissolve or break up in tetrahydrofuran, while cured samples will only swell, and the less the swell the tighter the cure.

EXAMPLE I 747.44 weight parts (0.873 mole) of poly (tetramethylene adipate) glycol, molecular weight 856 and 52.56 weight parts (0.584 mole) of 1,4-butanediol were mixed and heated to 120° C. and 160 grams (0.283 mole) of monohydroxy polyether monoacrylate was added. This monoacrylate has the formula shown herein above and contains a terminal hydroxyl and acrylate group. The unsaturated polyether has a hydroxyethyl acrylate content of 12.5%, a glycol content of 20%, OH functionality of 1.2, an OH number of 119, a molecular weight of $\overline{Mn}(OH)$ of 565, and contains 38.6 mole % ethylene oxide. 1.599 moles (1359.75 weight parts) of diphenylmethane-4,4'-diisocyanate was dissolved in the melt, along with 0.96% Irganox 1010 stabilizer, and the mixture heated to complete the reaction to form the polyurethane. The resulting polyurethane was dissolved in tetrahydrofuran, coated on release paper dried, and exposed to 5 to 10 megarad electron beam doses. The exposed samples and control were tested for stress strain properties according to ASTM procedure No. D412, and tested for solubility or percent swell in tetrahydrofuran. The unexposed control had a tensile strength at break of 3.1 GPa, an elongation of 200%, a 100% modulus of 3.1 GPa and dissolved in tetrahydrofuran. The 5 megarads exposed samples had tensile strengths of 21.01 GPa, a 330% elongation, a 100% modulus of 6.89 GPa, a 300% modulus of 18.6 GPa and a THF area swell of 224%. The 10 megarad treated sample had tensile of 13.78 GPa, a 235% elongation and a THF area swell of only 189%. This example is repeated with a diol polyether monocrylate having an average number molecular weight $\overline{Mn}(OH)$ of 445, hydroxyl number of 126 and a composition of 41.6 mole percent THF, 45.3 mole % ethylene oxide and 13.1 mole percent acrylate as ethyl hydroxy acrylate. Rapid and excellent cures of the resulting polyurethane are obtained.

EXAMPLE II 720 weight parts (0.841 mole) of poly(tetramethylene adipate) glycol, molecular weight 856, was melted and heated to 120° C. There was dissolved in this melt 47.6 weight parts (0.084 mole) of the hydroxyl terminated monoacrylate polyether of Example I, 180 weight parts of a polyether glycol with pendant unsaturated groups (0.30 mole). This polyether had a molecular weight $\overline{Mn}(OH)$ of 600 and contained copolymerized tetrahydrofuran, 52.1 mole %, 39.7 mole % methylene oxide and 8.2 mole % allyl glycidyl ether. 51.6 weight parts of 1,4-butanediol(0.573 moles), 1.76 moles of diphenylmethane-4,4-diisocyanate and 0.975 weight parts of Irganox 1010 stabilizer were added to the melt and the mixture heated to complete the reaction. Films were cast from this polymer from THF and exposed to 5 megarad dosages by the electron beam. The untreated film had a tensile of 34.45 GPa, an elongation of 590%, a 100% modulus of 4.13 GPa, a 300% modulus of 4.13 GPa and the sample broke up in THF. The samples treated to 5 megarads had a tensile of 37.96 GPa, a decreased elongation of 470%, an enhanced 100% modulus of 5.17 GPa and a 300% modulus of 10.34 GPa. The percent area swell of the sample in THF was 384%, showing the state of cure obtained with only a few seconds exposure to the electron beam.

EXAMPLE III 910 weight parts of poly(tetramethylene adipate) glycol, molecular weight 856 (1.063 moles) was heated to melt the glycol. 390 weight parts (0.470 mole) of a tetrahydrofuran polyether containing pendant unsaturated groups and composed of 59 mole % tetrahydrofuran polymerized with 41 mole % allyl glycidyl ether, $\overline{Mn}(OH)$ 830, was added to the melt, along with 87 weight parts of 1,4-butanediol (0.967 mole), 625 weight parts of diphenylmethane-4,4-diisocyanate (2.5 moles) and 1.4 weight parts of Irganox 1010 stabilizer, and the melt heated to complete the formation of the polyurethane. Films were cast and exposed to the electron beam for a 5 megarad dosage. The control sample had a tensile of 29.3 GPa, a 510% elongation, a 100% modulus of 4.48 GPa, a 300% modulus of 8.27 GPa, and the sample broke up in THF. The treated sample had a tensile of 29.63 GPa, 470% elongation, 100% modulus of 4.82 GPa, a 300% modulus of 9.3 GPa, and a THF area swell of 261%.

EXAMPLE IV 0.711 mole of poly(tetramethylene ether)glycol, molecular weight 984 was heated and mixed with 0.288 mole of a copolymer of tetrahydrofuran, allyl glycidyl ether and ethylene oxide having a molecular weight of 1041, an average of 1 pendant double bond per molecule and an ethylene oxide content of 43.1 mole %. 0.627 mole of 1.4-butanediol and 1.626 moles of diphenyl methane 4,4-diisocyanate were added and the mixture heated above 100° C. to complete the reaction. A 15% solid solution of the polymer was prepared in THF, 1-2 mil films were deposited, dried and given a 5 megarad treatment with the electron beam. The original sample had a tensile of 17.9 GPa, 840% elongation, and a 100% modulus of 2.41 GPa and a 300% modulus of 4.13 GPa. The sample dissolved completely in THF. The treated sample had an elongation of only 240%, a 100% modulus of 4.48 GPa and an area swell of only 172% in THF, all showing the excellent cure obtained on short exposure to the electron beam.

In a modification of this example, another electron beam curable polyurethane was prepared by reacting together 324.5 weight parts poly(tetramethylene adipate) glycol with 324.5 weight parts of a polyetherglycol having an average of about 1.5 double bonds per molecule, having a number average hydroxyl molecular weight of 1064 and a mole percent composition of 56.2% tetrahydrofuran 34.8% ethylene oxide and 9.0% allylglycidyl ether, 496 weight parts of 1,4-butanediol and 30 weight parts of diphenyl methane diisocyanate to provide an equimolar amount of —OH and —NCO groups. Exposure of films of this polyurethane to 5 megarads dosage provided a rapid cure in a few seconds to provide a film with low elongation; high modulus, and low swell in THF.

EXAMPLE V

Example IV was repeated using an unsaturated polyether glycol with only about ½ double bond per molecule. With this polyurethane, the original tensile was 3750 psi, the elongation was 800%, the 100% modulus was 2.760 GPa and the 300% modulus was 4.31 GPa and the sample dissolved in THF. The sample treated by a 5 megarad dosage had a tensile of 21.57 GPa, and elongation reduced to 450%, a 100% modulus of 3.1 GPa, and a 300% modulus of 7.23 GPa. The percent swell in THF was 261%.

EXAMPLE VI

Some improvement in cure of the polyurethanes is observed when there is added to the polyurethanes of this invention, before exposure to the electron beam, a tetrahydrofuran-poly(tetramethylene ether) diacrylate. This is conveniently added to the THF or other solution before deposition. The amount will be varied from about one to a about three weight parts, more usually five to 20 weight parts per 100 weight parts of polyurethane. A typical material will be made by a transesterification reaction of poly(tetramethylene ether)glycol, 1000 M.W., and methyl acrylate to provide two terminal unsaturated groups. To a sample of the polymer of Example I in 25% THF solution there was added this diacrylate in amount to provide 15 weight percent diacrylate and 85 weight percent of the polyurethane. After 5 megarads exposure the film sample had a tensile of 18.66 GPa, an elongation of 180%, a 100% modulus of 1350 psi and a THF area swell of only 156%. When this procedure was repeated with the polyurethane of Example II in the same ratio, after 5 megarads dosage the tensile strength was 38.58 GPa, elongation 440%, 100% modulus 6.2 GPa, 300% modulus 18.95 GPa and the THF area swell of 224%.

The novel electron beam curable polyurethanes of this invention are of particular value in magnetic media coatings in that they provide rapid and reproducible cured coatings that are harder and less elastomeric, providing dimensional stability to heat and increased resistance of the coatings to softening by frictional heat, and subsequent distortion or unusual wear. Further, the adhesion of the cured coating to the backing is improved. These advantages are in addition to the processing and handling advantages of the uncured binder formulations including processing stability, non-blocking rapid reproducible cure that are of particular rapid reproducible cure value in magnetic tape and discs.

I claim:

1. Electron beam-curable polyurethanes comprising the reaction product of (1) hydroxyl terminated polyesters, polyethers, polylactones, polycarbonates, or polyhydrocarbon maacropolyols, (2) unsaturated polyethers having an average of ½ to 18 double bonds per molecule selected from the group consisting of polyethers having one terminal hydroxyl group and one terminal double bond group and polyether glycols having pendant double bond groups, and (3) an organic diisocyanate.

2. The polyurethanes of claim I wherein (1) are hydroxyl-terminated polyesters or polyethers having average molecular weights of about 400 to 5,000, (2) the unsaturated polyethers are tetrahydrofuran polyethers having average molecular weights from about 300 to 2,000 and (3) the organic diisocyanate has the formula OCN-Ar-X-Ar-NCO wherein Ar is cyclic radical, X is a valence bond, an alkylene radical containing 1-5 carbon atoms or NR wherein R is alkyl radical containing 1 to 5 carbon atoms, oxygen, sulfur, sulfoxide or sulfone and (4) a diol chain extender.

3. The polyurethanes of claim 2 wherein (1) the polyethers have the formula $HO[(CH_2)_xO]_yH$ wherein x is 2 to 6 and y is an integer, the polyesters are polyesters of acids of the formula HOOC—R—COOH wherein R is an alkylene radical containing 1 to 10 carbon atoms aliphatic, containing 2 to 10 carbon atoms, both having molecular weights of 400 to 2,000, in (3) x is a valence bond or a $CH_2$ radical, and the polyurethane contains (4) from 0 to 10 mole per mole of polyester or polyether of an aliphatic glycol or aliphatic ether glycol chain extender containing 2 to 10 carbon atoms.

4. The polyurethanes of claim 3 wherein in (1) in the polyether in the acid x is 2 to 4, in the polyester acid R is 4 to 6 and the polyol is an alkylene glycol containing 2 to 6 carbon atoms, and the (4) chain extender is an alkylene glycol containing 2 to 6 atoms.

5. A polyurethane of claim 4 wherein the (2) unsaturated polyether glycol is a copolyether of 0 to 95 mole percent of copolymerized tetrahydrofuran, 100 to 5 mole percent of ally or methallyl glycidyl ether and 0 to 50 mole percent alkylene oxide wherein the alkylene groups contains 2 to 3 carbon atoms.

6. A polyurethane of claim 5 wherein said (1) polyether glycol is poly(tetramethylene ether)glycol and said polyester glycol is poly(tetramethylene adipate) glycol, said (2) unsaturated polyether glycol contains about 40 to 60 mole percent copolymerized tetrahydrofuran with about 5 to 50 mole percent allyl glycidyl ether and 0 to 50 mole percent of ethylene oxide and has a molecular weight of about 400 to 1,400, (4) there is present about 1 to 5 moles of 1,4-butanediol per mole of polyether or polyester glycol and (3) there is less than 0.005 weight percent free unreacted isocyanate groups in the polyurethane.

7. A polyurethane of claim 4 wherein (2) the unsaturated polyether has one terminal hydroxyl and one terminal unsaturated group and are copolymer reaction products of tetrahydrofuran, an alkylene oxide and hydroxyethyl esters of acrylic or methacrylic acid.

8. A polyurethane of claim 6 wherein in (1) said poly(tetramethylene adipate)glycol has a molecular weight of about 600 to 1,400, in (2) the unsaturated polyether glycol contains about 50 to 60 mole percent copolymerized tetrahydrofuran with about 5 to 50 mole percent allyl glycidyl ether and 0 to 40 mole percent of ethylene oxide, contains an average of 1 to 5 pendant double bond groups per molecule and has a molecular weight of about 500 to 1,400, present in amount of about 0.1 to 1.0 moles per mole of polyester glycol, (4) there is present about 1 to 5 moles of 1,4-butanediol per mole of polyester glycol and (3) is diphenylmethane-4,4'-diisocyanate.

9. A polyurethane of claim 6 wherein in (1) said poly(tetramethylene adipate) glycols, has a molecular weight from 600 to 1,400, in (2) the unsaturated polyether glycol contains about 60 mole percent copolymerized tetrahydrofuran with about 40 mole percent allyl glycidyl ether, about 1 to 3 pendant double bond groups per molecule and a molecular weight of about 500 to 1,400, present in amount of about 0.3 to 0.7 mole per mole of polyester glycol, (4) there is present about 1 to 5 moles of 1,4-butanediol per mole of polyester glycol and (3) is diphenylmethane-4,4'-diisocyanate.

10. A polyurethane of claim 5 wherein said (1) polyether glycol is poly(tetramethylene ether)glycol, having a molecular weight of 600 to 1,400, (2) unsaturated polyether glycol contains about 50 to 60 mole percent copolymerized tetrahydrofuran with about 5 to 50 mole percent allyl glycidyl ether and 0 to 50 mole percent of ethylene oxide, about 1 to 5 pendant double bond groups and a molecular weight of about 500 to 1,400, present in amount of about 0.1 to 1.0 moles per mole of polyether glycol, (4) there is present about 1 to 5 moles of 1,4-butanediol per mole of polyether or polyester glycol and (3) is diphenylmethane-4,4'-diisocyanate.

11. A polyurethane of claim 7 wherein the (2) unsaturated polyether containing one terminal hydroxyl group and one terminal double bond group is a copolyether of 30 to 65 mole percent of copolymerized tetrahydrofuran, 5 to 20 mole percent hydroxylethyl ester of acrylic or methacrylic acid and 30 to 50 mole percent alkylene oxide wherein the alkylene groups contains 2 to 4 carbon atoms, present in amount from 0.04 to 0.4 moles per mole of (1) polyether or polyester.

12. A polyurethane of claim 11 wherein said (1) polyether glycol is poly(tetramethylene ether)glycol and said polyester glycol is poly(tetramethylene adipate) glycol, said (2) unsaturated polyether contains 35 to 50 mole percent of ethylene oxide and has a molecular weight of about 400 to 800, present in amount of about to 0.04 0.4 moles per mole of polyether or polyester glycol, (4) there is present about 1 to 5 moles of 1,4-butanediol per mole of polyether or polyester glycol and (3) there is less than one weight percent free unreacted isocyanate groups in the polyurethane.

13. An electron beam-curable composition comprising (A) 100 weight parts of a polyurethane reaction product of (1) hydroxyl terminated polyesters, polyethers, polycarbonates, polylactones or, polyhydrocarbon macropolyols, (2) unsaturated polyethers having an average of ½ to 5 double bonds per molecule selected from the group consisting of polyethers having one terminal hydroxyl group and one terminal double bond group and polyether glycols having pendant double bond groups, and (3) an organic diisocyanate, and (B) from about 2 to about 100 parts by weight of a thermoplastic, linear copolymer of bisphenol A and epichlorohydrin, said copolymer having the molecular structure

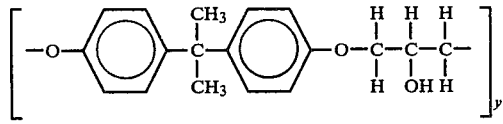

where y is a number of such magnitude that the molecular weight of said copolymer is within the range of about 20,000 to about 40,000.

14. The composition of claim 13 wherein in (A) the (1) polyethers have the formula $HO[(CH_2)_xO]_yH$ wherein x is 2 to 6 and y is an integer, the polyesters are polyesters of acids of the formula $HOOC-R-COOH$ wherein R is an alkylene radical containing 1 to 10 carbon atoms and glycols containing 2 to 10 carbon atoms, and the polyurethane contains from 0 to 10 mole per mole of polyester or polyether of an aliphatic glycol or aliphatic ether glycol chain extender containing 2 to 10 carbon atoms, (3) the organic diisocyanate has the formula $OCN-Ar-X-Ar-NCO$ wherein Ar is cyclic radical and X is a valence bond an alkylene radical containing 1-5 carbon atoms, and (B) is from about 2 to about 100 parts by weight of a thermoplastic, linear copolymer of bisphenol A and epichlorohydrin, said copolymer having the molecular structure

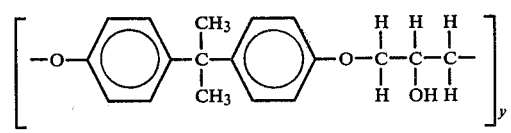

where y is a number of such magnitude that the molecular weight of said copolymer is about 30,000.

* * * * *

UNITED STATES PATENT AND TRADEMARK OFFICE
CERTIFICATE OF CORRECTION

PATENT NO. : 4,408,020
DATED : October 4, 1983
INVENTOR(S) : Edmund G. Kolycheck It is certified that error appears in the above-identified patent and that said Letters Patent are hereby corrected as shown below:

Col. 10, line 54 reads "aliphatic, containing",
should read --, aliphatic polyols containing--.

Col. 10, line 61 reads "polyether in the acid x is 2 to 4, in the polyester acid R";
should read --polyether x is 2 to 4, in the polyester in the acid R--.

Signed and Sealed this

Thirty-first Day of December 1985

[SEAL]

Attest:

Attesting Officer

DONALD J. QUIGG

Commissioner of Patents and Trademarks